(12) United States Patent
Caruso et al.

(10) Patent No.: US 10,197,041 B2
(45) Date of Patent: Feb. 5, 2019

(54) METHODS FOR JOINING SURFACE FEATURES TO WIND TURBINE ROTOR BLADES

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US); James Robert Tobin, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 318 days.

(21) Appl. No.: 14/852,886

(22) Filed: Sep. 14, 2015

(65) Prior Publication Data

US 2017/0074237 A1 Mar. 16, 2017

(51) Int. Cl.
*F03D 1/06* (2006.01)
(52) U.S. Cl.
CPC ......... *F03D 1/0675* (2013.01); *F03D 1/0633* (2013.01); *F05B 2230/60* (2013.01)
(58) Field of Classification Search
CPC ......... B29C 73/10; B29C 65/02; B29C 43/18; B29C 43/203; B29C 44/569; B29C 65/3412; B29C 65/3416; B29C 65/342; B29C 70/446; B29C 70/465; B29C 66/00; B29D 99/0025; B29D 99/0028; F03D 1/0675; F03D 1/0633; F03D 7/022;
(Continued)

(56) References Cited

U.S. PATENT DOCUMENTS

| | | | |
|---|---|---|---|
| 6,264,877 B1 | 7/2001 | Pallu De La Barriere | |
| 8,162,590 B2* | 4/2012 | Haag | F03D 1/0633 |
| | | | 415/4.3 |
| 8,317,479 B2 | 11/2012 | Vronsky et al. | |

(Continued)

FOREIGN PATENT DOCUMENTS

| | | |
|---|---|---|
| CN | 101906251 | 8/2010 |
| JP | 2007-92716 | 4/2007 |

(Continued)

OTHER PUBLICATIONS

Teuwen, et al.; "Vacuum Infused Thermoplastic Composites for Wind Turbine Blades," 2008 Wind Turbine Blade Workshop, Sandia National Laboratories—Presentation—May 12-14, 2008; (22 pages).

*Primary Examiner* — Jun S Yoo
(74) *Attorney, Agent, or Firm* — Dority & Manning, PA (57) ABSTRACT

Methods for joining surface features to wind turbine rotor blades are provided. A method includes providing the surface feature after forming of the rotor blade. The surface feature includes a thermoplastic resin. The formed rotor blade includes a plurality of blade components joined together to form an exterior surface defining a pressure side, a suction side, a leading edge, and a trailing edge each extending between a tip and a root. The formed rotor blade further includes a thermoplastic resin. The method further includes positioning the surface feature adjacent the exterior surface, and welding the thermoplastic resin of the surface feature and the thermoplastic resin of the formed rotor blade together.

9 Claims, 7 Drawing Sheets (58) Field of Classification Search
CPC . F03D 7/023; F03D 1/06; F03D 13/10; B23B 27/08
See application file for complete search history.

(56) References Cited

U.S. PATENT DOCUMENTS

| | | | |
|---|---|---|---|
| 8,657,581 B2 | 2/2014 | Pilpel et al. | |
| 8,673,106 B1 | 3/2014 | Jolley et al. | |
| 8,747,098 B1 | 6/2014 | Johnson et al. | |
| 8,961,142 B2* | 2/2015 | Wansink | B29D 99/0025 416/224 |
| 8,992,813 B2 | 3/2015 | Robbins et al. | |
| 9,709,030 B2* | 7/2017 | Tobin | F03D 1/0675 |
| 2009/0148300 A1 | 6/2009 | Driver et al. | |
| 2011/0097211 A1 | 4/2011 | Rudling | |
| 2011/0142668 A1* | 6/2011 | Rao | F03D 1/0675 416/229 R |
| 2013/0164133 A1 | 6/2013 | Grove-Nielsen | |
| 2013/0323065 A1* | 12/2013 | Murooka | F01D 5/141 416/219 R |
| 2014/0038029 A1* | 2/2014 | Thurmeier | H01M 2/1072 429/156 |
| 2014/0295187 A1 | 10/2014 | Jacobsen et al. | |
| 2016/0215757 A1* | 7/2016 | Behmer | B29C 70/086 |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

* cited by examiner

METHODS FOR JOINING SURFACE FEATURES TO WIND TURBINE ROTOR BLADES

FIELD OF THE INVENTION

The present disclosure relates generally to wind turbine rotor blades, and more particularly to methods for joining surface features to wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin.

Such rotor blades, however, are not without issues. For example, the bond lines of typical rotor blades are generally formed by applying a suitable bonding paste or compound along the bond line with a minimum designed bond width between the shell members. These bonding lines are a critical design constraint of the blades as a significant number of turbine blade field failures occur at the bond-line. Separation of the bond line along the leading and/or trailing edges of an operational turbine blade can result in a catastrophic failure and damage to the wind turbine.

One particular issue that has arisen involves the connection of surface features, such as vortex generators, noise reducers, winglets, root enhancers, etc., to such rotor blades. Because thermoset resins are utilized to form such rotor blades, thermoset-based joining techniques such as the application of bonding pastes must be utilized to join surface features to such rotor blades. It can thus be difficult and time-consuming to join surface features to such rotor blades, in particular after the rotor blades have been formed and/or when the rotor blades are uptower.

Accordingly, improved methods for joining surface features to wind turbine rotor blades would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a rotor blade assembly for a wind turbine is provided. The rotor blade assembly includes a rotor blade which includes a plurality of blade components joined together to form an exterior surface defining a pressure side, a suction side, a leading edge, and a trailing edge each extending between a tip and a root. The rotor blade further includes a thermoplastic resin. The rotor blade assembly further includes a surface feature extending from the exterior surface of the rotor blade and including a thermoplastic resin, the surface feature joined to the rotor blade by a welded interface between the thermoplastic resin of the surface feature and the thermoplastic resin of the rotor blade.

In accordance with another embodiment, a method for joining a surface feature to a wind turbine rotor blade is provided. The method includes providing the surface feature after forming of the rotor blade. The surface feature includes a thermoplastic resin. The formed rotor blade includes a plurality of blade components joined together to form an exterior surface defining a pressure side, a suction side, a leading edge, and a trailing edge each extending between a tip and a root. The formed rotor blade further includes a thermoplastic resin. The method further includes positioning the surface feature adjacent the exterior surface, and welding the thermoplastic resin of the surface feature and the thermoplastic resin of the formed rotor blade together.

In accordance with another embodiment, a method for joining a surface feature to a wind turbine rotor blade is provided. The method includes providing the surface feature after forming and shipment of the rotor blade. The surface feature includes a thermoplastic resin. The formed rotor blade includes a plurality of blade components joined together to form an exterior surface defining a pressure side, a suction side, a leading edge, and a trailing edge each extending between a tip and a root. The formed rotor blade further includes a thermoplastic resin. The method further includes positioning the surface feature adjacent the exterior surface; and welding the thermoplastic resin of the surface feature and the thermoplastic resin of the formed rotor blade together.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
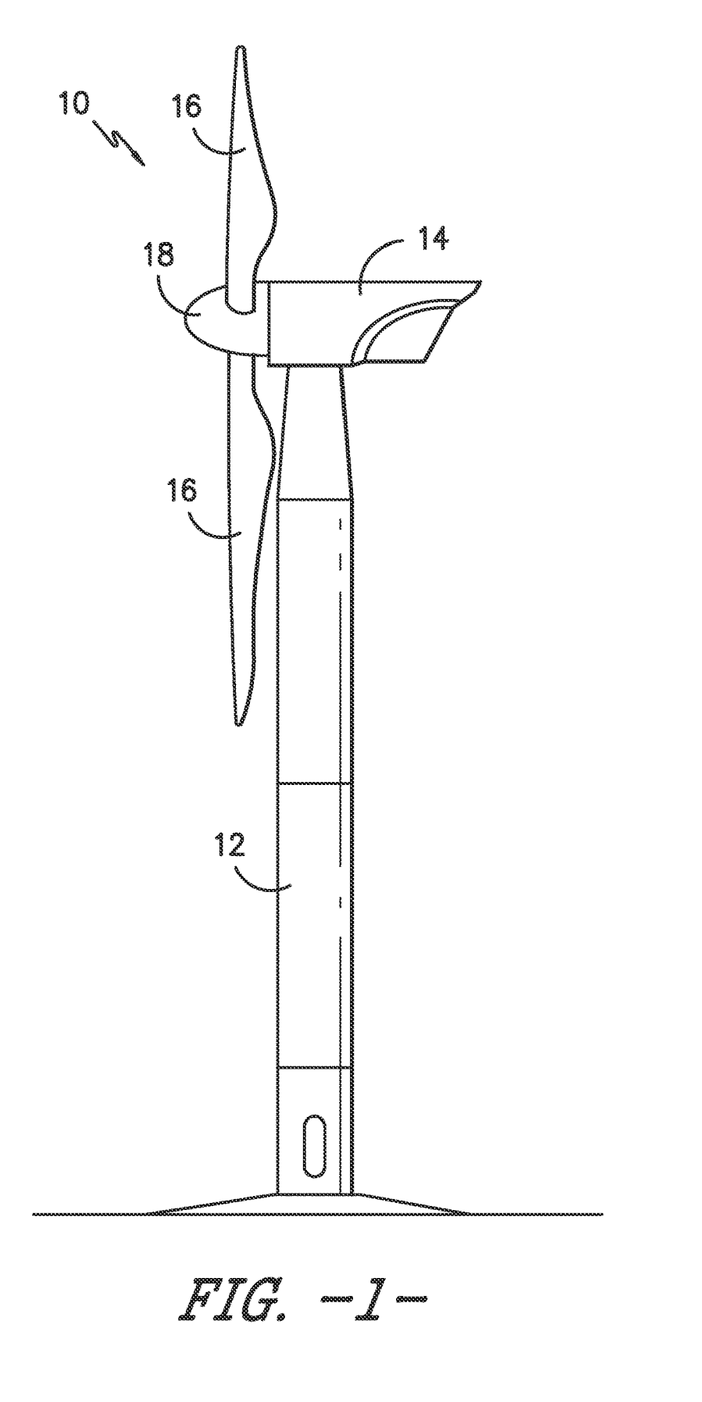
FIG. 1 is a perspective view of a wind turbine in accordance with one embodiment of the present disclosure.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The rotor blades 16 are considered to be uptower due to being erected on the tower 12 and wind turbine 10 generally. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Figure 2:
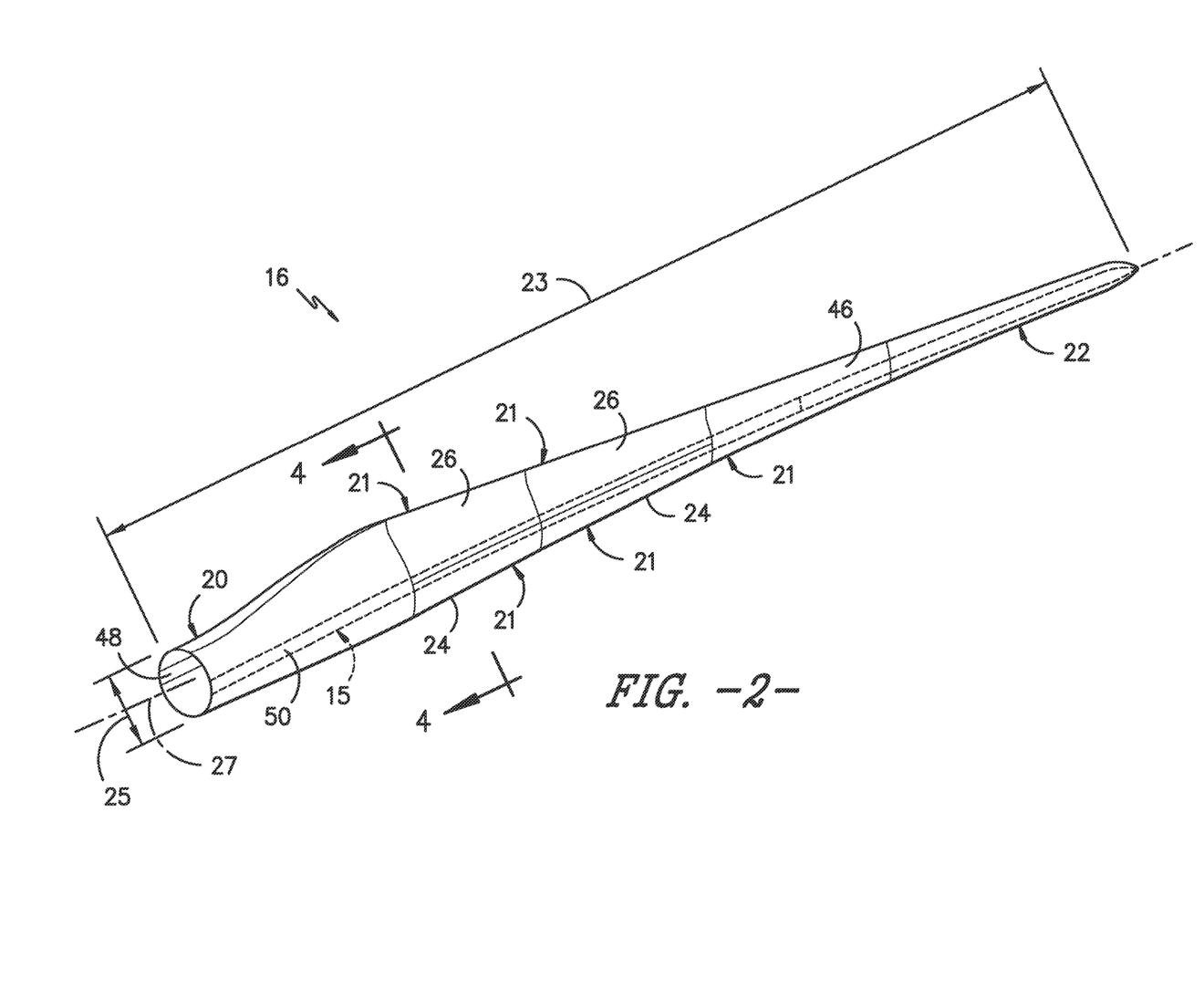
FIG. 2 is a perspective view of a formed rotor blade in accordance with one embodiment of the present disclosure.
Figure 3:
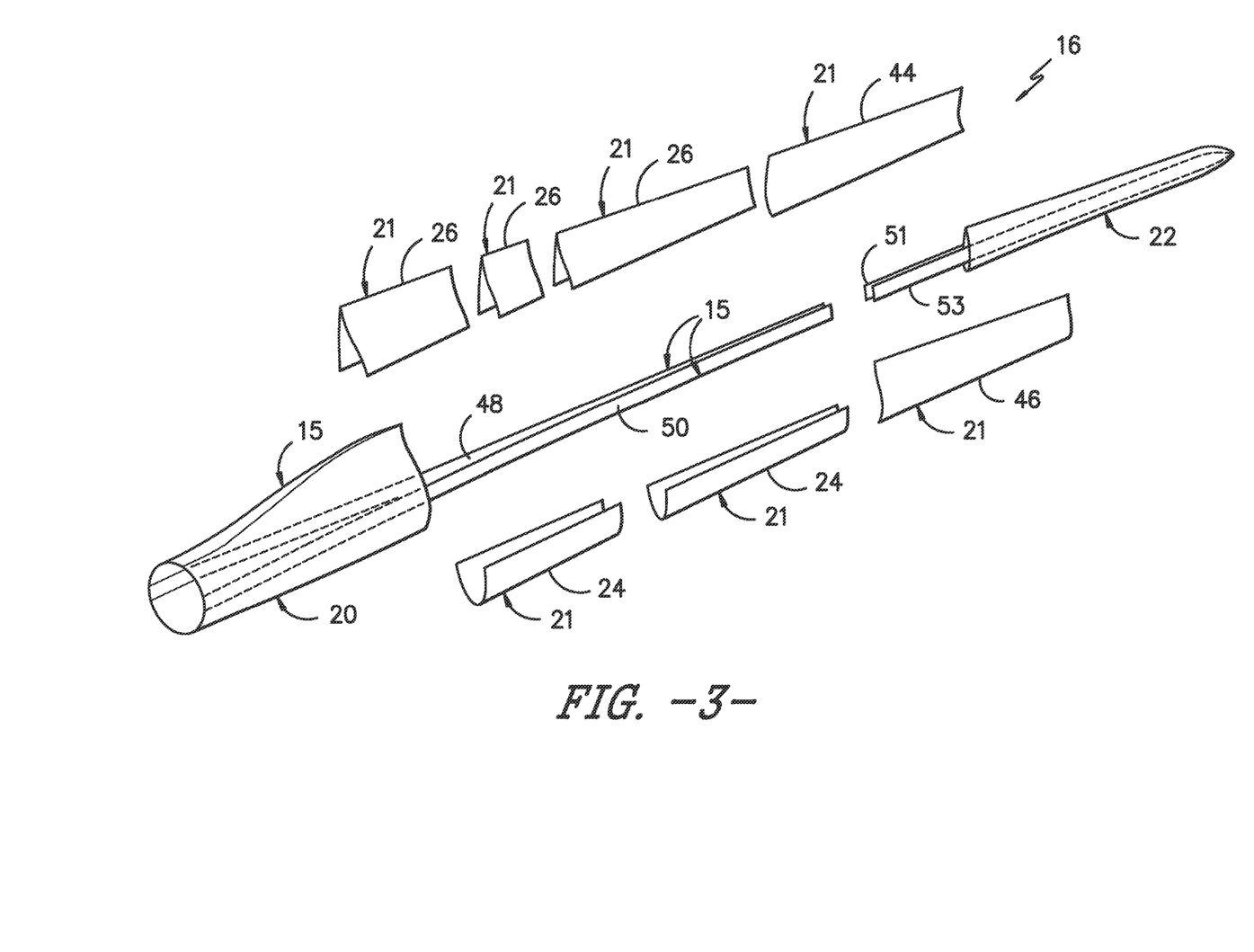
FIG. 3 is an exploded view of the rotor blade of FIG. 2.
Figure 6:
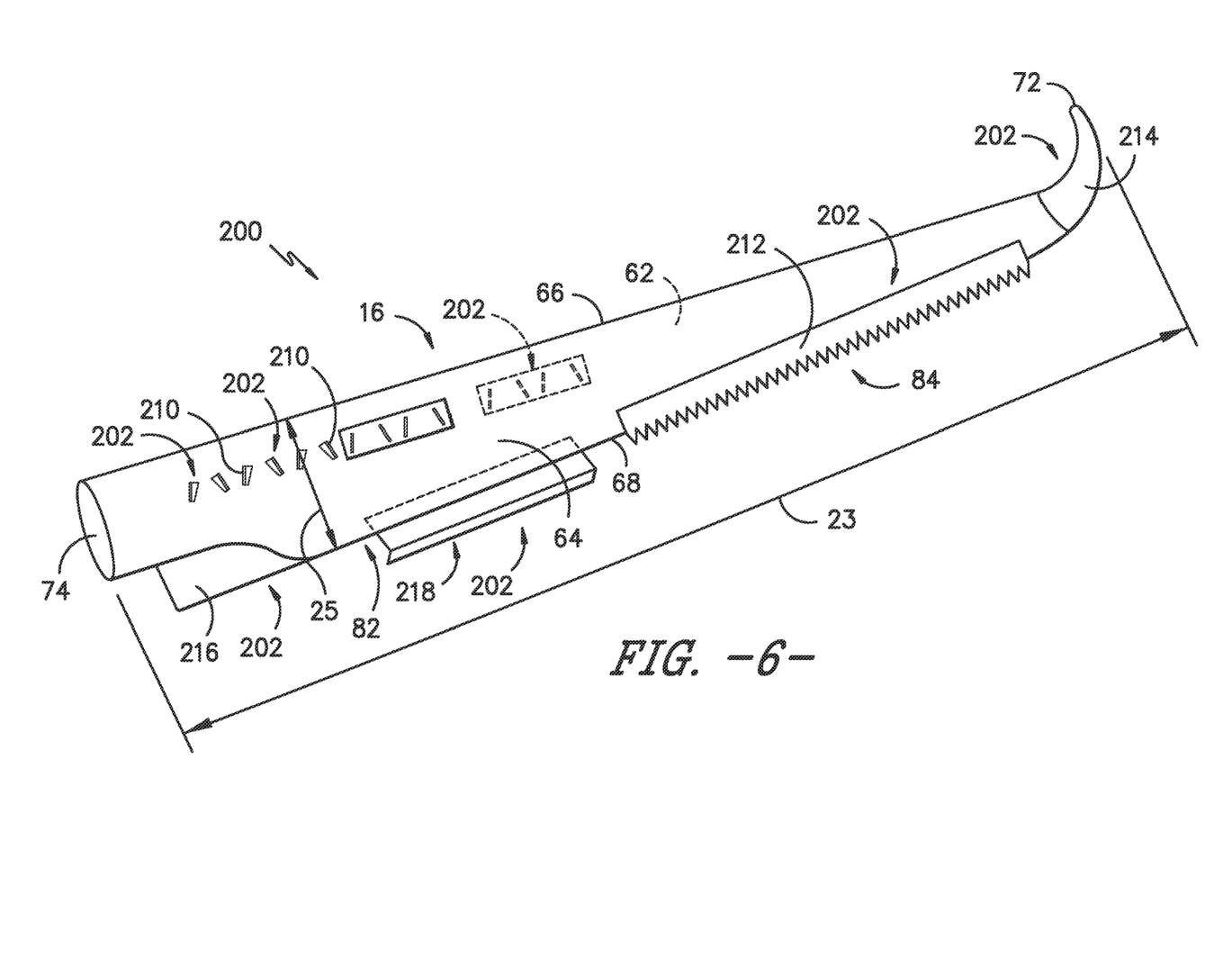
FIG. 6 is a perspective view of a rotor blade assembly in accordance with one embodiment of the present disclosure.

Referring now to FIGS. 2, 3 and 6, various views of rotor blades 16 according to the present disclosure are illustrated. As is generally understood, a rotor blade 16 according to the present disclosure may include an exterior surface 60 defining a pressure side 62, a suction side 64, a leading edge 66, and a trailing edge 68. The pressure side 62 and suction side 64 may each extend between the leading edge 66 and the trailing edge 68. The exterior surface 60 may extend between a blade tip 72 and a blade root 74 in a generally span-wise direction, as discussed below.

The pressure side, suction side, leading edge and trailing edge may be generally aerodynamic surfaces having generally aerodynamic contours, as is generally known in the art. Thus, the exterior surface of the rotor blade 16 may define an aerodynamic profile, such as an airfoil-like cross-sectional profile, for the rotor blade 16. The aerodynamic profile includes the pressure side, suction side, leading edge and trailing edge.

The rotor blade 16 may, in some embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord 23 and a span 25 extending in chord-wise and span-wise directions, respectively. The chord may vary throughout the span of the rotor blade 16. Thus, a local chord may be defined for the rotor blade 16 at any point on the rotor blade 16 along the span.

Additionally, as shown in FIGS. 2, 3 and 6, the rotor blade 16 may define an inboard portion 82 and an outboard portion 84. The inboard portion may be a span-wise portion of the rotor blade 16 extending from the root. For example, the inboard portion may, in some embodiments, include approximately 33%, 40%, 50%, 60%, 67%, or any percentage or range of percentages therebetween, or any other suitable percentage or range of percentages, of the span from the root. The outboard portion may be a span-wise portion of the rotor blade 16 extending from the tip, and may in some embodiments include the remaining portion of the rotor blade 16 between the inboard portion and the tip. Additionally or alternatively, the outboard portion may, in some embodiments, include approximately 33%, 40%, 50%, 60%, 67%, or any percentage or range of percentages therebetween, or any other suitable percentage or range of percentages, of the span from the tip.

As shown in FIGS. 2 and 3, a rotor blade 16 in accordance with the present disclosure includes a main blade structure 15 constructed, at least in part, from a thermoset or a thermoplastic resin and at least one outer blade segment 21 configured with the main blade structure 15. More specifically, as shown, the rotor blade 16 includes a plurality of outer blade segments 21. The blade segment(s) 21 may also be constructed, at least in part, from a thermoset or a thermoplastic resin. The thermoplastic and/or the thermoset resin as described herein may optionally be reinforced with a fiber material, including but not limited to glass fibers, carbon fibers, metal fibers, or similar or combinations thereof, embedded in the resin to form a composite. Continuous or discontinuous fibers may be utilized. In exemplary embodiments, continuous fibers are utilized. The direction of the fibers may include biaxial, unidirectional, triaxial, or any other another suitable direction and/or combinations thereof. Further, the fiber content within a composite may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIG. 4), and/or any other suitable structural component of the rotor blade 16. Further, the blade root section 20 is configured to be mounted or otherwise secured to the rotor 18 (FIG. 1). As mentioned, the rotor blade 16 defines a span 23 that is equal to the total length between the blade root section 20 and the blade tip section 22. The rotor blade 16 also defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

In some embodiments, as shown in FIGS. 2-3, the main blade structure 15 may include the blade root section 20 with one or more longitudinally extending spar caps 48, 50 infused therewith. For example, the blade root section 20 52 may be configured according to U.S. application Ser. No. 14/753,155 filed Jun. 29, 2015 entitled "Blade Root Section for a Modular Rotor Blade and Method of Manufacturing Same" which is incorporated by reference herein in its entirety. Similarly, the main blade structure 15 may include the blade tip section 22 with one or more longitudinally extending spar caps 51, 53 infused therewith. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof.

Figure 4:
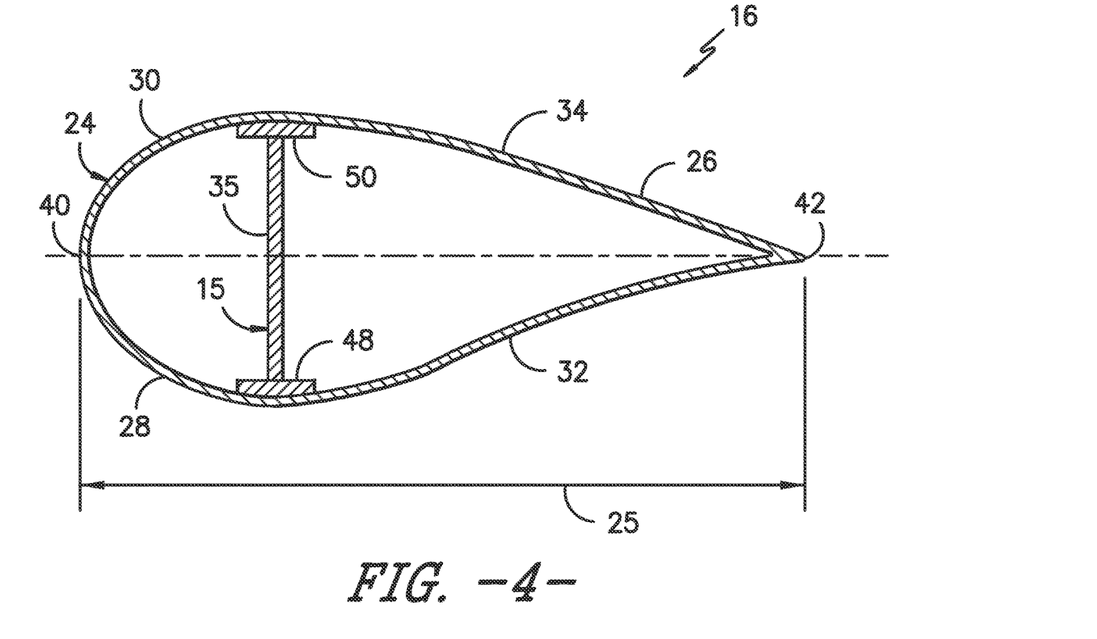
FIG. 4 is a cross-sectional view, along the line 4-4 of FIG. 2, of a rotor blade in accordance with one embodiment of the present disclosure.

In addition, as shown in FIG. 4, the main blade structure 15 may include one or more shear webs 35 configured between the one or more spar caps 48, 50, 51, 53. More particularly, the shear web(s) 35 may be configured to increase the rigidity in the blade root section 20 and/or the blade tip section 22.

Referring to FIGS. 2-4, any number of outer blade segments 21 having any suitable size and/or shape may be generally arranged between the blade root section 20 and the blade tip section 22 along a longitudinal axis 27 in a generally span-wise direction. The blade segments 21 generally serve as the outer casing/covering of at least a portion of the rotor blade 16 (such as between the blade root section 20 and the blade tip section 22) and may define a generally aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. As mentioned, the blade segments 21 may be constructed of any suitable materials, including but not limited to a thermoset material or a thermoplastic material optionally reinforced with one or more fiber materials. More specifically, as generally shown in the figures, the blade segments 21 may include any one of or combination of the following blade segments: pressure side segments, suction side segments 46, leading edge segments 24 and/or trailing edge segments 26.

More specifically, as shown in FIG. 4, the leading edge segments 24 may have a forward pressure side surface 28 and a forward suction side surface 30. Similarly, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16.

As discussed, the various blade components of the rotor blade 16, such as the main blade structure 15 and/or the various blade segments 21, may include a thermoset resin and/or a thermoplastic resin. Thermoplastic resins as described herein generally encompass a plastic material or polymer that is reversible in nature. For example, thermoplastic resins typically become pliable or moldable when heated to a certain temperature and return to a more rigid, solidified state upon cooling. Further, thermoplastic resins may include amorphous thermoplastic resins and/or semi-crystalline thermoplastic resins. For example, some amorphous thermoplastic resins may generally include, but are not limited to styrenes, vinyls, cellulosics, polyesters, acrylics, polysulphones, and/or imides. More specifically, example amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, example semi-crystalline thermoplastic resins may generally include, but are not limited to, polyolefins, polyamides, fluropolymers, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. The thermoset resins as described herein generally encompass a plastic material or polymer that is non-reversible in nature. For example, thermoset resins, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset materials.

Figure 5:
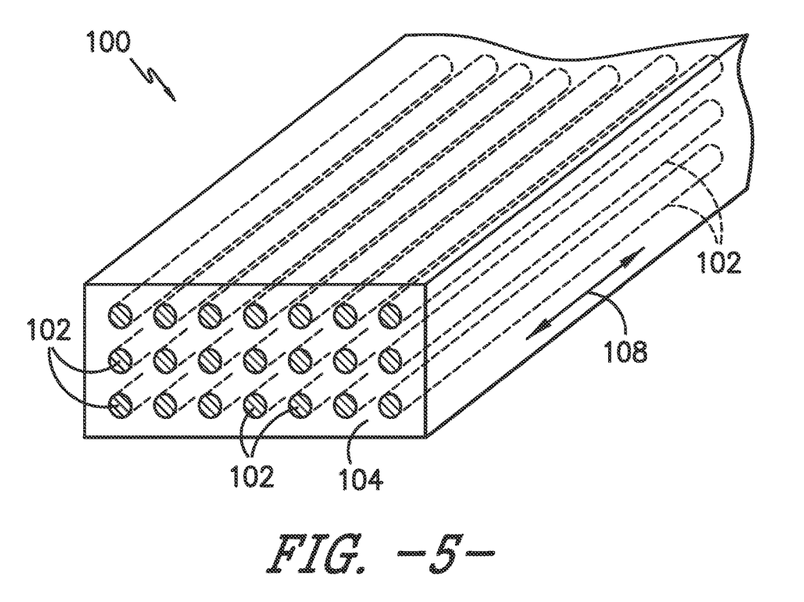
FIG. 5 is a perspective view of a portion of a composite utilized in various components of a rotor blade assembly in accordance with one embodiment of the present disclosure.

Referring briefly to FIG. 5, an embodiment of a composite 100 utilized in accordance with the present disclosure is provided. As illustrated, the composite 100 generally includes a resin 102 (which may be a thermoset or thermoplastic) and a plurality of fibers 104 embedded therein. In exemplary embodiments the fibers 104 are continuous, generally unidirectional fibers which extend along a longitudinal axis 108 as illustrated. Alternatively, discontinuous fibers may be utilized, and/or the fibers may extend at any suitable angles.

Figure 7:
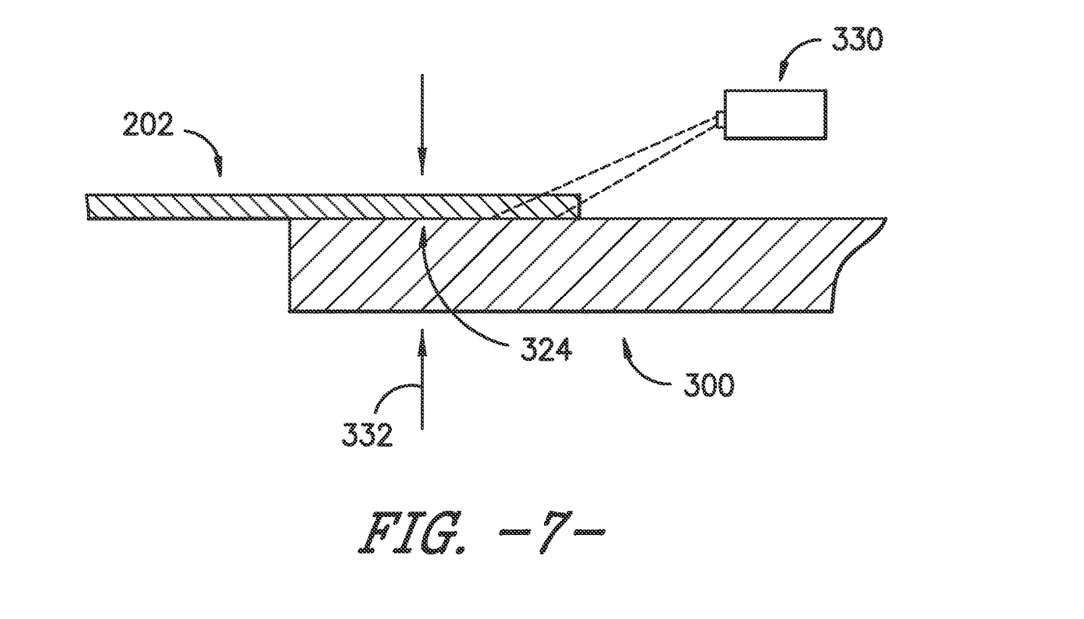
FIG. 7 is a schematic cross-sectional view of a surface feature being joined to a rotor blade in accordance with one embodiment of the present disclosure.
Figure 8:
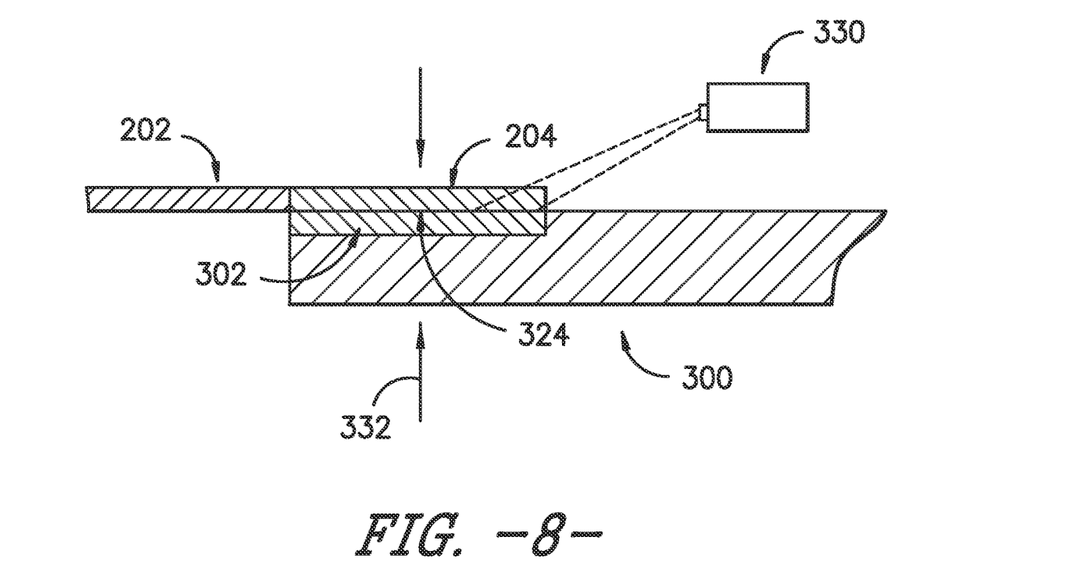
FIG. 8 is a schematic cross-sectional view of a surface feature being joined to a rotor blade in accordance with another embodiment of the present disclosure.

Referring now to FIGS. 6-8, the present disclosure is further directed to methods 400 for joining one or more surface features 202 to a rotor blade 16, forming a rotor blade assembly 200. FIG. 6 illustrates one embodiment of a rotor blade assembly 200 which includes a formed rotor blade 16 and a plurality of surface features 202 joined thereto.

A surface feature 202 is generally a component added to a surface of the rotor blade 16 to modify flow characteristics, lift characteristics, etc. of the rotor blade 16. For example, a surface feature may be a vortex generator 210. A plurality of vortex generators 210 are illustrated configured on the suction side 64 of the rotor blade 16 and on the pressure side 62 of the rotor blade 16. Vortex generators 210 may be utilized to reduce flow separation during operation of a rotor blade 16. In some embodiments, a vortex generator 210 may be generally fin-like, as shown. Alternatively, a vortex generator 210 may have any suitable shape.

Additionally or alternatively, a surface feature 202 may be a noise reducer 212. A noise reducer 212 is illustrated configured on the suction side 64 and extending from the trailing edge 68 of the rotor blade 16. Alternatively, a noise reducer 212 may be configured on the pressure side 64 and may extend from the trailing edge 68. Noise reducers 212 may be utilized to reduce noise generated by the wind flow over and away from a rotor blade 16. In some embodiments, a noise reducer 212 may include a plurality of serrations, as shown. Additionally or alternatively, a noise reducer 212 may include a plurality of bristles, or have any other suitable shape and/or configuration.

Further, a surface feature 202 may be a tip extension, such as a winglet 214. A winglet 214 is illustrated configured on the pressure side 62, suction side 64, leading edge 66, and trailing edge 68 of the rotor blade 16, and further in the embodiment illustrated defines the tip 72 of the rotor blade 16. Winglets 214 and other suitable tip extensions may be utilized to increase lift at the tip 72 of a rotor blade 16.

Still further, a surface feature 202 may be a root enhancer 216, trailing edge extension 218 or other suitable chord extension. A root enhancer 216 is illustrated configured on the pressure side 62, suction side 64, and trailing edge 68 of the rotor blade 16, and is disposed proximate the root 74. A trailing edge extension 218 is illustrated configured on the pressure side 62, but alternatively may be configured on the suction side 64 or otherwise configured on the rotor blade 16. The Trailing edge extension 218 extends past the trailing edge 68, as illustrated. Such chord extensions may be utilized to increase lift at the root 74 of a rotor blade 16.

It should be understood that the present disclosure is not limited to the above disclosed surface features 202. Rather, any suitable device or apparatus configured on an exterior surface of a rotor blade 16, such as the pressure side 62, suction side 64, and/or any other suitable location on the exterior surface, is within the scope and spirit of the present disclosure.

Referring again to FIGS. 6-8, rotor blade assemblies 200 formed in accordance with the present disclosure have improved joints between the various components thereof, such as between the rotor blade 16 and surface features 202 joined thereto. As discussed, the rotor blade 16 may include a thermoplastic resin. The thermoplastic resin may be included in one or more of the blade components 300 which form the rotor blade 16, such as the components of the main blade structure 15, the blade segments 21, or other suitable components. A blade component may thus include, and be formed at least partially from, a thermoplastic resin. In some embodiments, the resin may be a neat resin which is free from fibers. In other embodiments, the blade components may include fiber reinforced thermoplastic composites, which may include the thermoplastic resin and a plurality of fibers embedded in the thermoplastic resin as discussed herein.

Notably, a blade component 300 may in exemplary embodiments be formed from a plurality of layers, or plies. One or more of the plies may thus include the thermoplastic resin and/or composite as discussed.

In some embodiments, as illustrated in FIG. 7, an entire blade component 300 may include the thermoplastic resin (and, optionally, composite including the thermoplastic resin and fibers). Alternatively, as illustrated in FIG. 8, only one or more localized portions 302 of a blade component 300 may include the thermoplastic resin (and, optionally, composite including the thermoplastic resin and fibers). For example, one or more localized portions 302 may include the thermoplastic resin, while the remainder of a blade component 300 may include a thermoset resin (and, optionally, a composite which includes the thermoset resin and fibers embedded therein). In some embodiments, for example, a localized portion 302 may be one or more of the plies forming the blade component 300. At least one localized portion 302 may be a joint portion which is utilized to form a joint as discussed herein and thus is in contact with or adjacent to a surface feature as discussed herein.

Similarly, in some embodiments, as illustrated in FIG. 7, an entire surface feature 202 may include a thermoplastic resin as discussed above (and, optionally, composite including the thermoplastic resin and fibers as discussed above). Alternatively, as illustrated in FIG. 8, only one or more localized portions 204 of the surface feature 202 may include the thermoplastic resin (and, optionally, composite including the thermoplastic resin and fibers). For example, one or more localized portions 204 may include the thermoplastic resin, while the remainder of the surface feature 202 may include a thermoset resin (and, optionally, a composite which includes the thermoset resin and fibers embedded therein), a metal, a ceramic, or another suitable material. In exemplary embodiments, at least one localized portion 204 may be a joint portion which is utilized to form a joint as discussed herein and thus is in contact with or adjacent to one or more blade components 300 when joined with the rotor blade 16 to form rotor blade assembly 200.

Notably, in exemplary embodiments, the thermoplastic resin of the rotor blade 16 and blade component(s) 300 to which the surface feature 202 is to be joined may be the same as the thermoplastic resin of the surface feature 202. Alternatively, the thermoplastic resins may be different.

Figure 9:
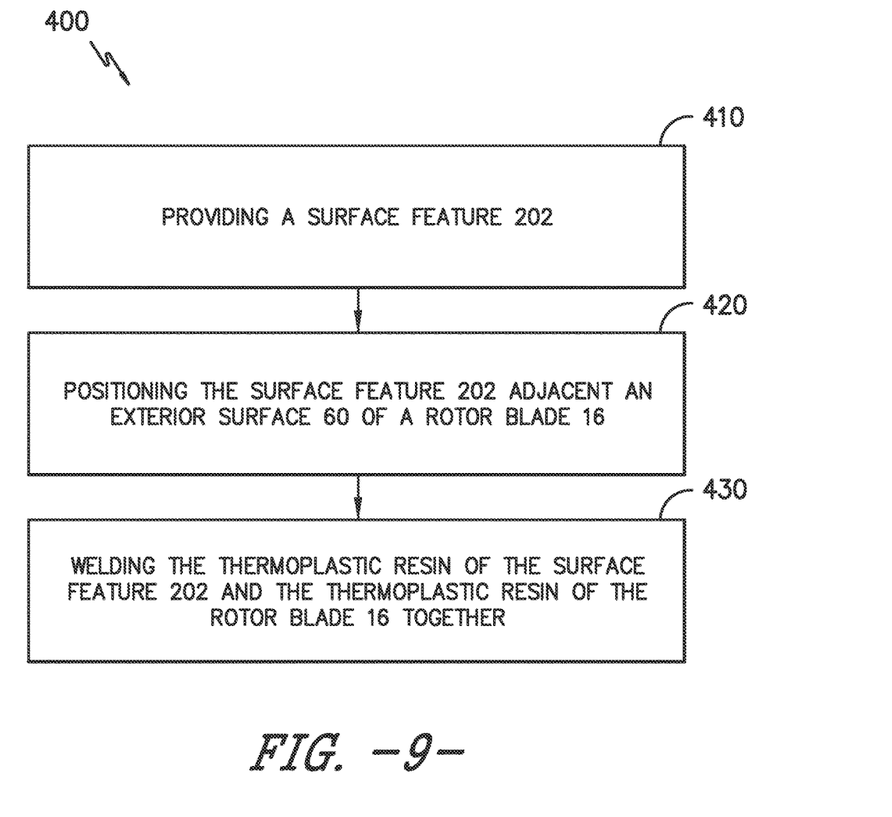
FIG. 9 is a flow chart illustrating a method for joining a surface feature to a rotor blade in accordance with one embodiment of the present disclosure.

Referring now also to FIG. 9 and in accordance with embodiments of method 400, and as illustrated as step 410, a surface feature 202 may be provided, such as after forming of the rotor blade 16. A formed rotor blade 16 in accordance with the present disclosure may include blade components as discussed above which are all joined together to form the exterior surface 60 of the rotor blade 16 as discussed herein. Such forming of the rotor blade 16 may, for example, be performed at a formation site for the rotor blade 16, such as a manufacturing facility. The formation site is generally a separate site from an erection site at which the wind turbine 10 is erected. The rotor blade 16 or rotor blade assembly 200 may be transported, such as via ground, air and/or water-based transportation methods, from a formation site to an erection site.

After the providing step 410 and as illustrated as step 420, the surface feature 202 may be positioned adjacent to the exterior surface 60 of the rotor blade 16, such as adjacent one or more blade components 21 thereof. In exemplary embodiments, the surface feature 202 may be positioned in contact with the exterior surface 60. Alternatively, an insert which may assist with joining may be disposed between and in contact with the exterior surface and the surface feature 202. The insert may, for example, include a thermoplastic resin. In some embodiments, the resin may be a neat resin which is free from fibers. In other embodiments, the insert may include a fiber reinforced thermoplastic composite, which may include the thermoplastic resin and a plurality of fibers embedded in the thermoplastic resin as discussed herein. Further, in some embodiments, an insert may include an energy absorptive pigment which may be dispersed within the resin. The energy absorptive pigment may assist in, for example, laser welding.

After the positioning step 420 and as illustrated as step 430, method 400 may further include welding the thermoplastic resin of the surface feature 202 and the thermoplastic resin of the rotor blade 16 together, such as at a joining location wherein the surface feature 202 is adjacent to (such as in contact with) the exterior surface 60. In exemplary embodiments, the thermoplastic resin of the surface feature 202 and the thermoplastic resin of the rotor blade 16 may be welded directly to each other. Any suitable welding process may be utilized to weld the thermoplastic resin of the surface feature 202 and the thermoplastic resin of the rotor blade 16 together. For example, suitable welding techniques may include resistive welding, hot gas welding, speed tip welding, extrusion welding, contact welding, hot plate welding, high frequency welding, induction welding, injection welding, ultrasonic welding, friction welding, laser welding, or solvent welding.

In exemplary embodiments, welding step 430 may include heating the thermoplastic resin of the surface feature 202 and the thermoplastic resin of the rotor blade 16 (such as blade components 300 thereof), such as at the joining location. In some embodiments, a suitable heating element 330 may be utilized to heat the resins. The heating element may, for example, be a heat gun, laser, etc. Alternatively, heat may be generated via friction or another suitable method. The resins may for example, be heated to above the melting points of the resins in order to facilitate joining thereof.

Further, in exemplary embodiments, a compressive force 232 may be applied to the rotor blade 16 (such as the blade components 300 thereof) and the surface feature 202, such as at the joining location. Such force 332 may be applied before, during and/or after heating to facilitate bonding at a weld interface 324 therebetween. Any suitable clamping mechanisms or other suitable apparatus for providing a compressive force 332.

Further, in exemplary embodiments, the rotor blade 16 (such as the blade components 300 thereof) and surface feature 202, such as the thermoplastic resins thereof, may be cooled, such as after heating. Cooling allows the resins to re-solidify and the bonds between the rotor blade 16 and the surface feature 202 to be completed at the interface 324. In some embodiments, cooling is performed by simply allowing the rotor blade 16 and the surface feature 202 to rest in an ambient temperature environment. In other embodiments, suitable active cooling techniques utilizing cooled air or another suitable gas or liquid may be utilized.

Methods for joining surface features 202 to rotor blades 16 in accordance with the present disclosure provide numerous advantages. In particular, joining is advantageously efficient due to the use of thermoplastic materials, and the resulting joints are relatively stronger than joints that result from the use of materials such as thermosets. Further, in exemplary embodiments, such joining can easily be performed in various environments after the rotor blade 16 has been formed.

For example, in some embodiments, such joining, and thus steps 410, 420 and 430, may be performed before transport of the rotor blade 16 from the formation site. Accordingly, a rotor blade 16 can be formed, and surface features 202 can be efficiently and robustly joined thereto to form a rotor blade assembly 300 as desired after such formation and before transport to an erection site.

Alternatively, the surface feature 202 can be provided after formation and shipment of the formed rotor blade 16 to an erection site. Such embodiments may be particularly advantageous, as the rotor blade 16 can be shipped before without surface features 202 extending therefrom to prevent damage to the surface features 202 during such shipment. The surface features 202 can then be joined to the rotor blade 16 to form a rotor blade assembly 200 at an intermediate point during shipment or after shipment when the rotor blade 16 has reached the erection site.

Further, in some embodiments, such steps 410, 420, 430 may be performed after the rotor blade 16 has been erected on the wind turbine 10, such as in some embodiments after a period of use of the rotor blade 16. For example, the rotor blade 16 can be disassembled from the wind turbine 10 for joining, or in particular exemplary embodiments, the steps 410, 420, 430 can be performed uptower when the blade 16 is configured on the tower 12 and wind turbine 10 generally. Accordingly, surface features 202 can advantageously be added to an existing blade 16 to enhance the performance of the blade 16, such as after a period of use of the blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for joining a surface feature to a wind turbine rotor blade, the method comprising:
   providing the surface feature after forming of the rotor blade, the surface feature comprising a thermoset and a localized portion of a thermoplastic resin, the formed rotor blade comprising a plurality of blade components joined together to form an exterior surface defining a pressure side, a suction side, a leading edge, and a trailing edge each extending between a tip and a root, the formed rotor blade further comprising a thermoplastic resin;
   positioning the surface feature adjacent the exterior surface;
   after forming of the rotor blade, welding the thermoplastic resin of the surface feature and the thermoplastic resin of the formed rotor blade together; and
applying a compressive force to the surface feature and the rotor blade at least one of before, during, or after welding.

2. The method of claim 1, wherein the providing, positioning and welding steps are performed before transport of the rotor blade from a formation site.

3. The method of claim 1, wherein the welding step comprises:
   heating the thermoplastic resin of the surface feature and the thermoplastic resin of the formed rotor blade; and
   cooling the thermoplastic resin of the surface feature and the thermoplastic resin of the formed rotor blade.

4. The method of claim 1, wherein the surface feature is positioned in contact with the exterior surface.

5. The method of claim 1, wherein the entire surface feature comprises the thermoplastic resin.

6. The method of claim 1, wherein only a localized portion of the plurality of blade components comprises the thermoplastic resin.

7. The method of claim 1, wherein the entire plurality of blade components comprises the thermoplastic resin.

8. The method of claim 1, wherein the surface feature and the formed rotor blade each comprises a fiber reinforced thermoplastic composite, the composite comprising the thermoplastic resin and a plurality of fibers embedded in the thermoplastic resin.

9. The method of claim 1, wherein the surface feature is one of a vortex generator, noise reducer, tip extension or chord extension.

\* \* \* \* \*